US009917888B1

(12) United States Patent
Bonagiri et al.

(10) Patent No.: US 9,917,888 B1
(45) Date of Patent: *Mar. 13, 2018

(54) DATA INTEGRATION APPLICATION EXECUTION MANAGEMENT

(71) Applicant: INTERNATIONAL BUSINESS MACHINES CORPORATION, Armonk, NY (US)

(72) Inventors: Krishna K. Bonagiri, Ambajipet (IN); Kalyanji Chintakayala, Hyderabad (IN); Eric A. Jacobson, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/700,575

(22) Filed: Sep. 11, 2017

Related U.S. Application Data

(63) Continuation of application No. 15/478,471, filed on Apr. 4, 2017.

(51) Int. Cl.
G06F 15/16 (2006.01)
H04L 29/08 (2006.01)
H04L 12/911 (2013.01)
H04L 12/24 (2006.01)

(52) U.S. Cl.
CPC .......... *H04L 67/10* (2013.01); *H04L 41/0803* (2013.01); *H04L 47/70* (2013.01)

(58) Field of Classification Search
CPC ...... H04L 67/10; H04L 47/70; H04L 41/0803
See application file for complete search history.

(56) References Cited

U.S. PATENT DOCUMENTS

| 8,954,981 | B2 | 2/2015 | Harris et al. | |
|---|---|---|---|---|
| 8,988,998 | B2 | 3/2015 | Adam et al. | |
| 9,594,637 | B2 | 3/2017 | Jacobson et al. | |
| 2003/0200212 | A1* | 10/2003 | Benson | G06F 9/466 |
| 2004/0049573 | A1* | 3/2004 | Olmstead | H04L 67/10 709/224 |
| 2011/0161281 | A1* | 6/2011 | Sayyaparaju | G06F 17/30377 707/607 |

(Continued)

OTHER PUBLICATIONS

IBM, "Managed and Unmanaged Nodes," IBM Knowledge Center—WebSphere Application Server Network Deployment, Last Modified on Feb. 9, 2017, p. 1-3, https://www.ibm.com/support/knowledgecenter/SSAW57_8.0.0/com.ibm.websphere.nd.multiplatform.doc/info/ae/ae/cagt_node.html, Accessed on Mar. 27, 2017.

(Continued)

*Primary Examiner* — Hieu Hoang
(74) *Attorney, Agent, or Firm* — Alexis N. Hatzis

(57) ABSTRACT

Disclosed aspects relate to data integration application execution management using both a set of managed nodes and a set of unmanaged nodes. An execution request for a data integration application may be sensed. A first set of commands of the data integration application may be assigned to the set of managed nodes. A second set of commands of the data integration application may be assigned to the set of unmanaged nodes. Execution of the data integration application may be initiated using the set of managed nodes to process the first set of commands and the set of unmanaged nodes to process the second set of commands.

1 Claim, 10 Drawing Sheets

(56) References Cited

U.S. PATENT DOCUMENTS

| | | | |
|---|---|---|---|
| 2013/0024863 A1* | 1/2013 | Parkinson | G06F 9/466 718/101 |
| 2014/0047228 A1* | 2/2014 | Attar | G06F 9/44505 713/2 |
| 2014/0047414 A1* | 2/2014 | Attar | G06F 9/4411 717/121 |
| 2015/0095917 A1* | 4/2015 | Challenger | G06F 9/4843 718/104 |
| 2016/0094415 A1 | 3/2016 | Bonagiri et al. | |
| 2016/0283370 A1 | 9/2016 | Kumpera et al. | |

OTHER PUBLICATIONS

Mell et al., "The NIST Definition of Cloud Computing," National Institute of Standards and Technology, Sep. 2011, p. 1-3, Special Publication 800-145.

Reeder, "Hybrid Iron.io—On-Premise Job Processing with the Help of the Cloud," Hybrid Iron.io, Jun. 9, 2016, p. 1-5, https://www.iron.io/hybrid-iron-io-on-premise-job-processing-with-the-help-of-the-cloud/, Accessed on Mar. 27, 2017.

IBM, "List of IBM Patents or Patent Applications Treated as Related (Appendix P)," Oct. 23, 2017, p. 1-2.

Bonagiri et al., "Data Integration Application Execution Management," Application and Drawings, Filed on Apr. 4, 2017, 65 pages, U.S. Appl. No. 15/478,471.

* cited by examiner

1000

```
{
 node "node1"
 {
  fastname "managed: mynode1"
  pool "" "a"
  resource disk "/home/kbonagir/yarn_aug1/orch_master/pds_files/node0" { pool "" "export" "node0" "node0a"}
 } node "node2"
 {
  fastname "managed: $HOST_NAME"
  pool "" "b"
  resource disk "/home/kbonagir/yarn_aug1/orch_master/pds_files/node1" { pool "" "export" "node1" "node1a"}
 } node "node3"
 {
  fastname "unmanaged: mynode3"
  pool "" "a"
  resource disk "/home/kbonagir/yarn_aug1/orch_master/pds_files/node0" { pool "" "export" "node0" "node0a"}
 }
} node "node3"
{
 fastname "mynode5"
 pool "" "a"
 resource disk "/home/kbonagir/yarn_aug1/orch_master/pds_files/node0" { pool "" "export" "node0" "node0a"}
}
}
```

FIG. 10

DATA INTEGRATION APPLICATION EXECUTION MANAGEMENT

BACKGROUND

This disclosure relates generally to computer systems and, more particularly, relates to data integration application execution management using both a set of managed nodes and a set of unmanaged nodes. The amount of data that needs to be managed using a set of managed nodes and a set of unmanaged nodes is increasing. As data needing to be managed increases, the need for data integration application execution management using both a set of managed nodes and a set of unmanaged nodes may also increase.

SUMMARY

Aspects of the disclosure relate to running parallel data integration applications on a combination of managed and unmanaged nodes. Data integration applications or Extract, Transform and Load (ETL) jobs may be executed on a set of nodes which are specified in a node configuration file. A data integration application execution management system may provide a solution for running an ETL job on a combination of nodes in a hybrid cluster. When an execution request is detected, it may be assigned to either the set of managed nodes or the set of unmanaged nodes. When the data integration application is utilized, the execution request may be processed on both sets of nodes in an integrated or hybrid fashion, comprising of both the set of managed nodes and the set of unmanaged nodes.

Disclosed aspects relate to data integration application execution management using both a set of managed nodes and a set of unmanaged nodes. An execution request for a data integration application may be sensed. A first set of commands of the data integration application may be assigned to the set of managed nodes. A second set of commands of the data integration application may be assigned to the set of unmanaged nodes. Execution of the data integration application may be initiated using the set of managed nodes to process the first set of commands and the set of unmanaged nodes to process the second set of commands.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 10 illustrates an example of data integration application execution management using both a set of managed nodes and a set of unmanaged nodes, according to embodiments.

Figure 1:
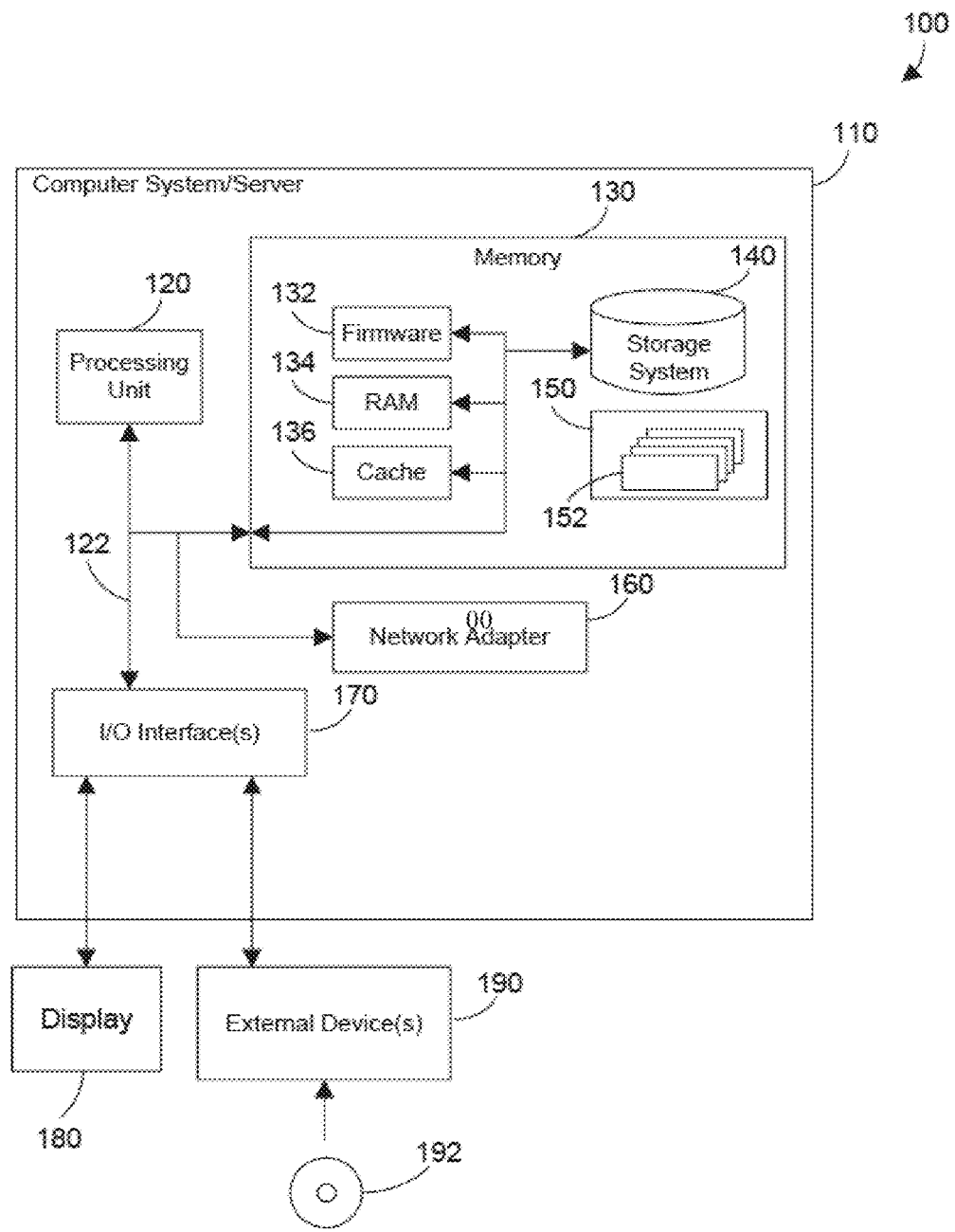
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to running parallel data integration applications on a combination of managed and unmanaged nodes. Data integration applications or Extract, Transform and Load (ETL) jobs may be executed on a set of nodes which are specified in a node configuration file. A data integration application execution management system may provide a solution for running an ETL job on a combination of nodes in a hybrid cluster. When an execution request is detected, it may be assigned to either the set of managed nodes or the set of unmanaged nodes. When the data integration application is utilized, the execution request may be processed on both sets of nodes in an integrated or hybrid fashion, comprising of both the set of managed nodes and the set of unmanaged nodes.

Existing resource management (RM) tools such as Hadoop YARN (trademark of the Apache Software Foundation) offer allocation of resources based on requirements (e.g., memory and CPU), allocation of resources on a given node name, and launching of the application on the allocated nodes. An RM tool may allocate the resources while an Application Master (AM) tool (e.g., Resource Negotiator tool) is responsible for receiving resources from the RM tool and executing the application request on the cluster. Data integration applications may be desired to be executed on a combination of resources dynamically allocated via an RM tool and resources not managed by an RM tool. A data integration application execution management system may allow a user to execute an ETL job on a combination of managed and unmanaged sets of nodes.

Aspects of the disclosure include a method, system, and computer program product for data integration application execution management using both a set of managed nodes and a set of unmanaged nodes. An execution request for a data integration application may be sensed. A first set of commands of the data integration application may be assigned to the set of managed nodes. A second set of commands of the data integration application may be assigned to the set of unmanaged nodes. Execution of the data integration application may be initiated using the set of managed nodes to process the first set of commands and the set of unmanaged nodes to process the second set of commands.

In embodiments, the configuration file may include prefix tags, such as "managed" and "unmanaged" before the node names. The nodes tagged with "managed" may include an RM tool to allocate the resources, while the "unmanaged" nodes may not include an RM tool. In certain embodiments, the managed nodes may be tagged to indicate a dynamic node. In embodiments, the system may automatically detect whether a node in the configuration file belongs to the managed cluster or not by comparing the node with a list of the set of managed nodes. In embodiments, ETL jobs may be executed on the combination of managed and unmanaged sets of nodes. Altogether, aspects of the disclosure can have performance or efficiency benefits. Aspects may save resources such as bandwidth, disk, processing, or memory. As an example, processing may be saved through the execution of a data integration application on a combination of managed and unmanaged nodes. Executing a request dynamically on a plurality of types or kinds of nodes may require less processing time than executing a request on only one type or kind of node (e.g., only managed nodes, only unmanaged nodes, only unspecified nodes). Other examples of saving processing using a data integration application execution management system may also be possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
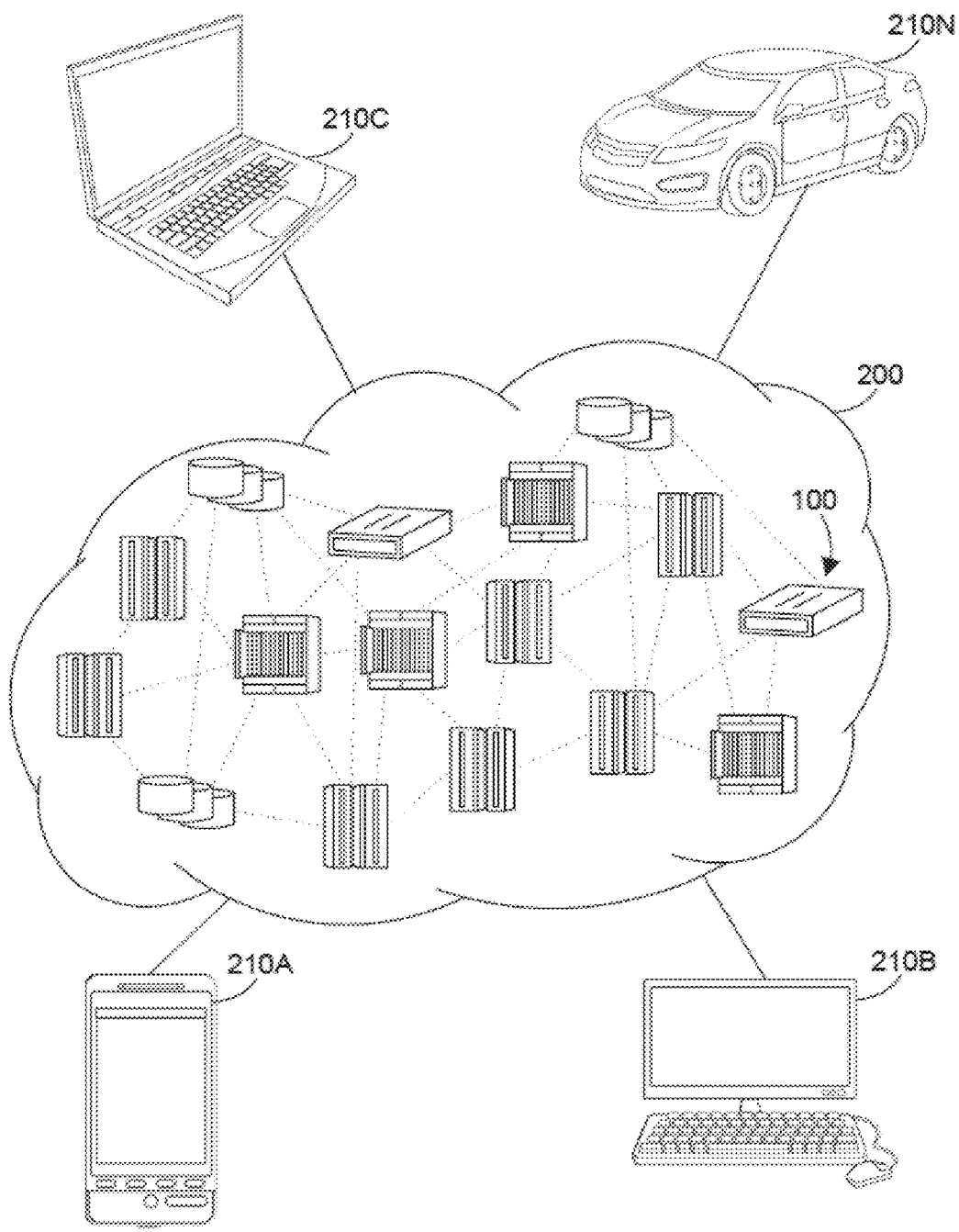
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
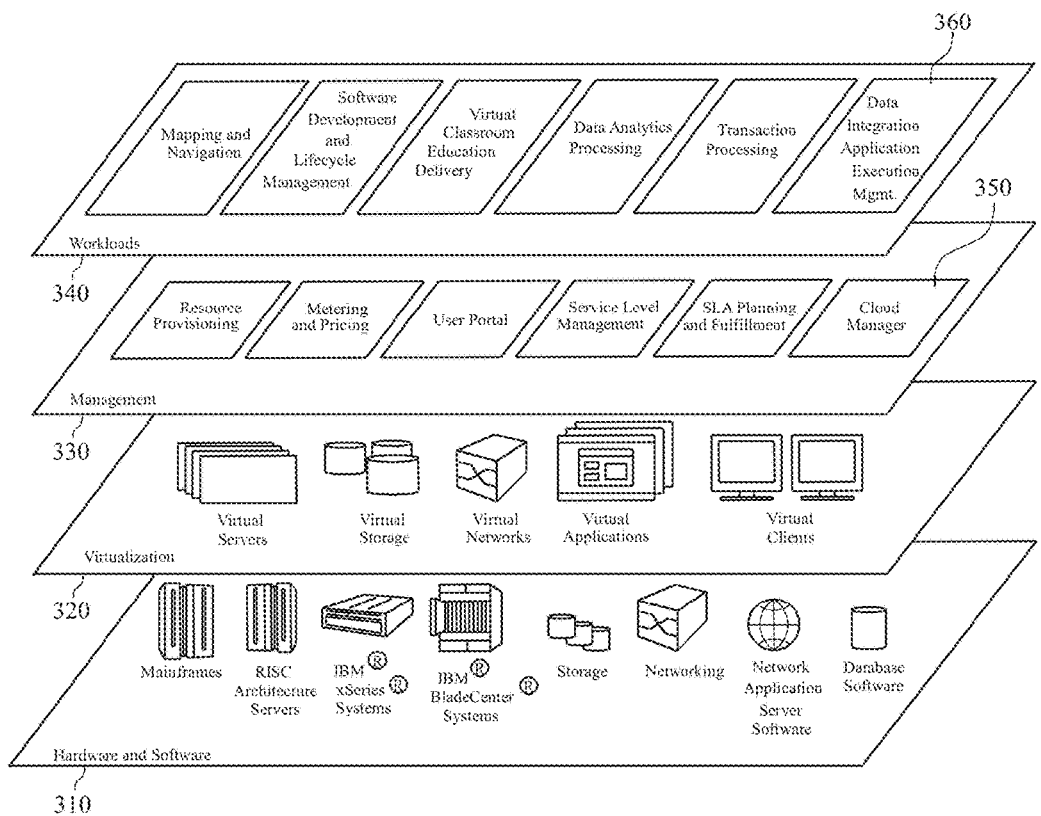
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration application execution management 360, which may be utilized as discussed in more detail below.

Figure 4:
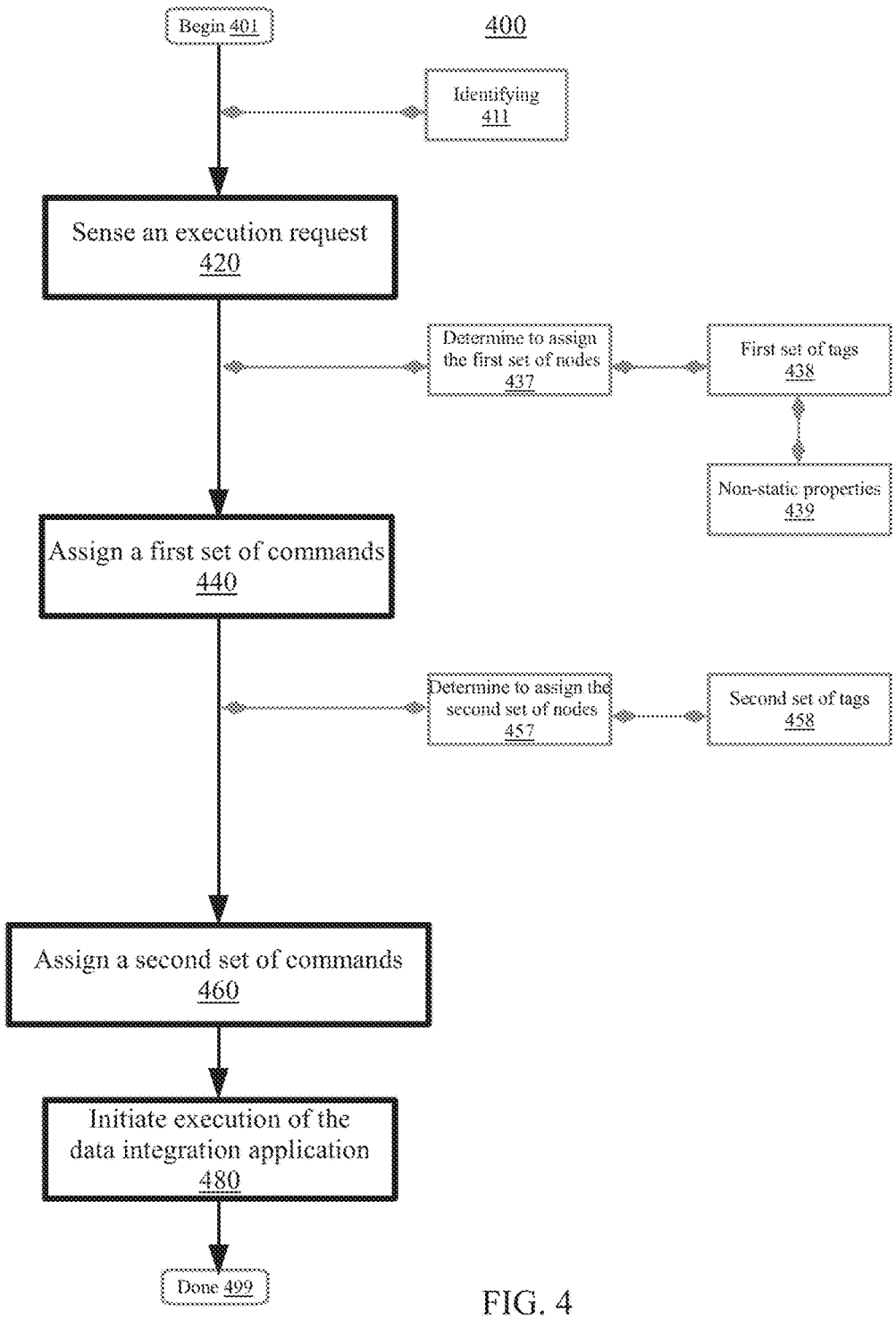
FIG. 4 is a flowchart illustrating a method for data integration application execution management using both a set of managed nodes and a set of unmanaged nodes, according to embodiments.

FIG. 4 is a flowchart illustrating a method 400 for data integration application execution management using both a set of managed nodes and a set of unmanaged nodes, according to embodiments. Data integration may include combining data from different sources and providing users with a unified view of this data. An application which manages data integration may efficiently and effectively combine the data from different sources or servers. A grouping of servers may make up a node. Nodes may be managed or unmanaged. An unmanaged node may not have a resource manager (RM) to manage its servers. A managed node may have an RM to manage its servers. An RM may include a type or kind of node which organizes, instructs, and delegates tasks to other nodes. The data integration application execution management engine may utilize both a set of managed nodes and a set of unmanaged nodes. The data integration application may occur within a shared pool of configurable computing resources, a hybrid computing environment, or the like. The method 400 may begin at block 401.

In embodiments, it may be identified that the set of unmanaged nodes do not belong to a managed cluster of nodes at block 411. Generally, identifying can include recognizing, discovering, distinguishing, detecting, ascertaining, or determining. The data integration application execution management system may distinguish between the set of unmanaged nodes and the set of managed nodes. The set of unmanaged nodes may be identified as nodes which do not include an RM to manage its servers. The set of unmanaged nodes may differ from the set of managed nodes (e.g., nodes which include an RM). The system may distinguish or separate the managed and unmanaged nodes as part of processing an execution request. As an example, two sets of nodes which are part of a larger database may be compared to one another. It may be determined that node set A includes an RM tool while node set B does not include such a tool. The data integration application execution management system may identify node set B as a set of unmanaged nodes, thus differentiating this set from node set A.

At block 420, an execution request for a data integration application may be sensed. Sensing can include detecting, receiving, recognizing, identifying, discovering, or ascertaining. An execution request may include a command, call, or instruction to carry-out a data integration application. The execution request may include a query to integrate multiple datasets, a command to combine multiple servers, or the like. The execution request may be sensed in response to a triggering event (e.g., the opening of a new window, the entering of a query) or a user input. The execution request may be sensed automatically (e.g., without manual intervention) by the data integration application execution management system. The system may dynamically (e.g., ongoing, on-the-fly) detect or identify an execution request.

Consider the following example. A large database may be used by a group of scientists to store data from an ongoing experiment. One of the scientists may wish to execute a request/command on the set of data. As an example, the scientist may wish to combine/join two tables of data within this database (e.g., Table 3 and Table 5). The scientist may enter an ETL command (e.g., COMBINE T3_T5). The data integration application execution management system may automatically sense an execution request when the scientist begins typing the ETL command. The system may prepare to initiate execution of the data integration as described herein. Other examples of sensing an execution request may also be possible.

In embodiments, it may be determined to assign the first set of commands of the data integration application to the set of managed nodes at block 437. Generally, determining can include resolving, ascertaining, concluding, establishing, or arranging. The first set of commands (e.g., of the execution request) may be assigned to the set of managed nodes. The determining may occur based on a set of configuration data. The set of configuration data (e.g., in the configuration file)

may include code, queries, node identifiers, commands, and the like of a first set of commands. The set of configuration data may have a first set of indicators that corresponds to the first set of commands of the data integration application. The first set of indicators may include markings, signals, indices, or the like which designate or specify a particular quality or criterion of the first set of commands.

In embodiments, the first set of indicators may be structured at block 438. Structuring can include constructing, modifying, altering, adjusting, or configuring. The first set of indicators may be structured to include a first set of tags coupled with a set of managed node identifiers for the set of managed nodes. The first set of tags may include a mark, signal, or other alert (e.g., word, phrase, special character) which indicates a specific quality of the first set of commands. The first set of tags may be combined, linked, incorporated, or joined with a set of managed node identifiers of the set of managed nodes. The managed node identifiers may include names or other indications (e.g., a prefix tag, a marker before a node name) signaling the presence of a set of managed nodes. The configuration file may include a prefix tag (e.g., "managed") before the node names. The nodes tagged with "managed" may indicate that these nodes belong to managed clusters having an RM.

In embodiments, the first set of indicators may be configured at block 439. Configuring can include setting-up, programming, modifying, or structuring. The first set of indicators may be configured to have one or more non-static node identification properties. Managed nodes may be identified as having static or non-static properties. A non-static node may be dynamic or changeable, while a static node may include a fixed node (e.g., on which a partition of data needs to be processed). The non-static nodes may be indicated as such by the RM based on the availability of resources in the cluster. The nodes may be tagged (e.g., by a $) to denote a dynamic/non-static node.

Consider the following example. The scientist described herein may want to combine Table 3 and Table 5 from a database. Both tables may exist on a cluster of nodes. Table 3 may relate to a first set of commands (e.g., the data from Table 3 will first need to be transferred to a new combined dataset). Configuration data for Table 3 may be collected, including queries, commands, and node identifiers. As an example, the node identifier may be indicated as "nodet3". The node identifier may also include a non-static (e.g., dynamic) node identification property. The node identifier may be marked/tagged by a "$" to indicate that the node is non-static. Based on the configuration data, "nodet3" may be determined as a set of managed nodes. The node may be tagged with "managed" to indicate that it belongs to the set of managed nodes. This may be indicated as: "managed: $nodet3" in the configuration file. It may be determined to assign the first set of commands to the set of managed nodes (e.g., nodet3). Other examples of using node identifiers and tags to distinguish between managed and unmanaged nodes may also be possible.

At block 440, a first set of commands of the data integration application may be assigned to the set of managed nodes. Generally, assigning can include allocating, distributing, deploying, delegating, or designating. The first set of commands may include Extract, Transform and Load (ETL) commands, Standard Query Language (SQL) commands, and the like. The commands may include a selecting command, an updating command, an order by command, an aggregate function, or other ETL or SQL commands. The first set of commands may be coupled or joined with the set of managed nodes for processing or executing. In certain embodiments as described herein, the assignment may be determined based on a set of configuration data. The assigning may occur as part of executing the data integration application. In various embodiments, a job executor (e.g., PX conductor) may classify the nodes as managed. The job executor may send the list of managed node names (e.g., static, dynamic) to the RM tool. The RM tool may allocate resources for all the managed nodes and send the list of actual node names back to the job executor. At block 460, a second set of commands of the data integration application may be assigned to the set of unmanaged nodes. Generally, assigning can include allocating, distributing, deploying, delegating, or designating. The second set of commands may be coupled or joined with the set of unmanaged nodes for processing or executing. In certain embodiments as described herein, the assignment may be determined based on a set of configuration data. The assigning may occur as part of executing the data integration application. In various embodiments, the job executor may classify the nodes as unmanaged.

Consider the following example. The scientist example described herein may require assigning the sets of commands to managed and unmanaged nodes. The commands to process Table 3 may be included in the first set of commands while the commands to process Table 5 may be included in the second set of commands. The Table 3 commands may be assigned to a set of managed nodes (e.g., nodet3) with an RM tool. The Table 5 commands may be assigned to a set of unmanaged nodes (e.g., nodet5) without an RM tool. The two sets of commands may be linked or combined with their specified sets of nodes for processing an execution request. Other examples of assigning a set of commands to a set of (managed or unmanaged) nodes may also be possible.

In embodiments, it may be determined to assign the second set of commands of the data integration application to the set of unmanaged nodes at block 457. Generally, determining can include resolving, ascertaining, concluding, establishing, or arranging. The second set of commands (e.g., of the execution request) may be assigned to the set of unmanaged nodes. The determining may occur based on the set of configuration. The set of configuration data (e.g., in the configuration file) may include code, queries, node identifiers, commands, and the like of a second set of commands. The set of configuration data may have a second set of indicators that corresponds to the second set of commands of the data integration application. The second set of indicators may include markings, signals, indices, or the like which designate or specify a particular quality or criterion of the second set of commands.

In embodiments, the second set of indicators may be structured at block 458. Structuring can include constructing, modifying, altering, adjusting, or configuring. The second set of indicators may be structured to include a second set of tags coupled with a set of unmanaged node identifiers for the set of unmanaged nodes. The second set of tags may include a mark, signal, or other alert which indicates a specific quality of the second set of commands. The second set of tags may be combined, linked, incorporated, or joined with a set of unmanaged node identifiers of the set of unmanaged nodes. The unmanaged node identifiers may include names or other indications (e.g., a prefix tag, a marker before a node name) signaling the presence of a set of unmanaged nodes. The configuration file may include a prefix tag (e.g., "unmanaged") before the node names. The nodes tagged with "unmanaged" may indicate that these nodes belong to unmanaged clusters which do not have an RM to allocate resources.

Consider the following example. The scientist described herein may want to combine Table 3 and Table 5 from a database. Both tables may exist on a cluster of nodes. Table 5 may relate to a second set of commands (e.g., the data from Table 5 will be transferred to a new combined dataset separate from the data from Table 3). Configuration data for Table 5 may be collected, including queries, commands, and node identifiers. As an example, the node identifier may be indicated as "nodet5". Based on the configuration data, "nodet5" may be determined as a set of unmanaged nodes. The determination may be based on a lack of an RM tool. This may be indicated as: "unmanaged: nodet5" in the configuration file. It may be determined to assign the second set of commands to the set of unmanaged nodes (e.g., nodet5). Other examples of using node identifiers and tags to distinguish between managed and unmanaged nodes may also be possible.

At block 480, execution of the data integration application may be initiated. Generally, initiating can include enacting, running, executing, performing, carrying-out, launching, or implementing. The initiating may occur using the set of managed nodes to process the first set of commands of the data integration application and the set of unmanaged nodes to process the second set of commands of the data integration application. The set of managed nodes (e.g., with an RM) may execute or perform the first set of commands while the set of unmanaged nodes may execute or perform the second set of commands. This method of processing may provide for efficient and effective processing of large sets of data through integration. In embodiments, the job executor and resource negotiator may perform the execution of the data integration application. The commands for managed nodes may be sent to the RM tool for launching (e.g., on the allocated resources). The commands for the unmanaged nodes may be run using shell commands (e.g., SSH or RSH).

Consider the following example. The sets of commands for Table 3 and Table 5 may be assigned to different sets of nodes as described herein. The data integration application may process the request from the scientist and initiate execution of data integration. The set of managed nodes (e.g., nodet3) may process the first set of commands related to Table 3. The set of unmanaged nodes (e.g., nodet5) may process the second set of commands related to Table 5. The data integration application may combine (e.g., integrate) data from both tables to create one table for the scientist to utilize. The new table may include information from both Tables 3 and Table (e.g., the data has been integrated). Other examples of initiating execution of the data integration application may also be possible.

Method 400 concludes at block 499. Aspects of method 400 may provide performance or efficiency benefits for data integration application execution management. Aspects may save resources such as bandwidth, disk, processing, or memory. As an example, processing may be saved by using both managed and unmanaged nodes to execute a data integration application. In this way, data can be distinguished or sorted to multiple nodes for execution or performance as opposed to using only one type/kind of node, which may save processing. Other examples of saving processing may also be possible.

Figure 5:
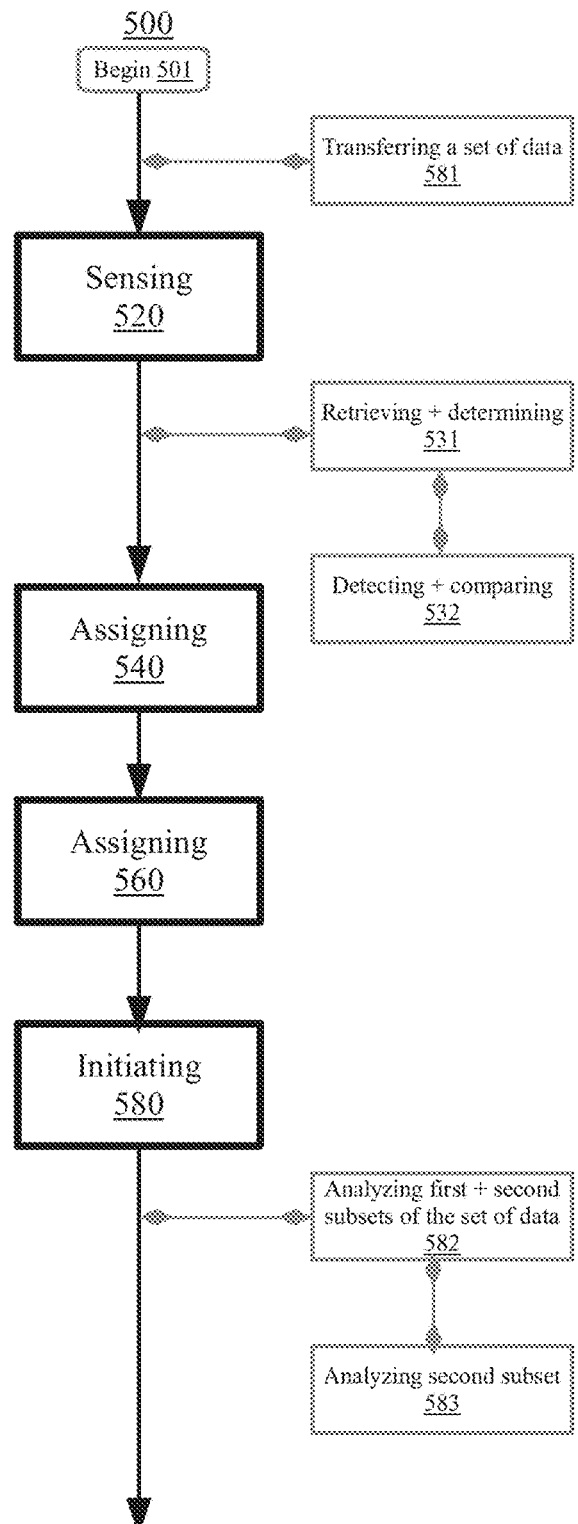
FIG. 5 is a flowchart illustrating a method for data integration application execution management using both a set of managed nodes and a set of unmanaged nodes, according to embodiments.

FIG. 5 is a flowchart illustrating a method 500 for data integration application execution management using both a set of managed nodes and a set of unmanaged nodes, according to embodiments. Aspects may be similar or the same of method 400, and aspects may be utilized interchangeably. The method 500 may begin at block 501.

In embodiments, a set of data may be transferred at block 511. Generally, transferring can include delivering, relocating, sending, transmitting, providing, or conveying. The transferring may occur between an unmanaged cluster of nodes and a managed cluster of nodes. The transferring may occur when data is moved into a cluster managed by an RM from another cluster not managed by an RM (e.g., and vice versa). The transferring may include moving a set of data from a Hadoop YARN tool to a non-Hadoop YARN tool. The transferring may occur as part of performing the execution request of data integration application. The transferring may act as a triggering event (e.g., indicate that the integration of data should be executed). The transferring of a set of data may integrate the data from both the managed and unmanaged cluster of nodes in order to process an execution request. At block 520, an execution request for a data integration application may be sensed.

Consider the following example. Two branches of a corporation may wish to combine two datasets containing branch annual sales records (e.g., dataset A containing annual sales from Seattle and dataset B containing annual sales from Chicago). The datasets A and B may be transferred between a set of unmanaged cluster nodes and a set of managed cluster nodes. As an example, an RM tool (e.g., Hadoop YARN) of the set of managed cluster nodes may transmit the two datasets to a set of unmanaged cluster nodes (e.g., without Hadoop YARN). In this way, the datasets may be integrated in order to perform the execution request. Dataset A may be assigned to the set of managed cluster nodes and dataset B may be assigned to the set of unmanaged cluster nodes. The execution request may be initiated, combining the two datasets into one as part of an ETL job. Other examples of transferring a set of data between an unmanaged cluster of nodes and a managed cluster of nodes may also be possible.

In embodiments, retrieving and determining may occur at block 531. A set of managed node identifiers may be retrieved. Retrieving can include recovering, capturing, obtaining, or gathering. The set of managed node identifiers may correspond (e.g., belong) to a managed cluster of nodes. RM tools of managed clusters may provide application program interfaces (APIs) to find a list of available cluster nodes. The data integration application execution management system may access the stored clusters and retrieve (e.g., pull, grab, capture) them. The retrieving may be used to determine if a given node name belongs to a set of managed clusters. It may be determined to assign the first set of commands of the data integration application to the set of managed nodes and the second set of commands of the data integration application to the set of unmanaged nodes. Generally, determining can include resolving, ascertaining, concluding, establishing, or arranging. The determining may occur using the set of managed node identifiers which corresponds to the managed cluster of nodes. The data integration application execution management system may automatically (e.g., without manual intervention) detect if a node in the configuration file belongs to the managed or unmanaged cluster using the node name or tag (e.g., "managed", "unmanaged").

Consider the following example. A bank may want to process an execution request to combine information from multiple bank accounts of a particular client. The execution request may include a first and second set of commands. The first set of commands may relate to accessing the savings account of the client and arranging the savings account data by date. The second set of commands may relate to accessing the checking account of the client and arranging the checking account data by date. The data integration application may access and retrieve a set of nodes with particular node identifiers. The application may extract a list of available cluster nodes from an RM tool. The node identifiers may indicate a managed cluster of nodes. As an example, a particular set of nodes may be identified as "managed: mynode11" in the configuration file. The set of managed node identifiers may be utilized to assign the first set of commands of the data integration application to the set of managed nodes and the second set of commands of the data integration application to the set of unmanaged nodes. The set of managed nodes (e.g., "managed: my node11") may process the savings account data for the client while the set of unmanaged nodes (e.g., which may be indicated as "unmanaged: may node5" or the like) may process the checking account data for the client. An execution request may be initiated and the bank may be provided with combined data from the accounts of their client. Other examples of retrieving a set of managed node identifiers and determining an assignment for sets of commands may also be possible.

In embodiments, detecting and comparing may occur at block 532. A set of unspecified node identifiers may be detected. Detecting can include sensing, receiving, recognizing, identifying, discovering, or ascertaining. The set of unspecified node identifiers may include identifiers which do not indicate whether the node is managed or unmanaged, a node not having any prefixed tags, or the like. The detecting may occur in a set of configuration data. The detecting may occur automatically (e.g., without manual/user intervention). Detecting the set of unspecified nodes may require greater processing time due to the large amount of nodes in managed clusters. Specifying managed or unmanaged nodes may require less processing time. The automatic detection may be used for part of a list of nodes in the configuration file. The automatic detection may be used only for the nodes not having prefixed tags. The set of unspecified node identifiers in the set of configuration data may be compared with the set of managed node identifiers which belong to the managed cluster of nodes. Comparing can include analyzing, contrasting, or correlating. The data integration application execution management system may search for similarities or connections between the set of unspecified node identifiers and the set of managed node identifiers. If similarities are found, the unspecified node may be assigned to the set of managed node identifiers as described herein. As an example, an unspecified node identifier may be compared with respect to a listing of managed node identifiers. If a match is found, the unspecified node identifier may be assigned to the set of managed nodes. If no match is found, the unspecified node identifier may be assigned to the set of unmanaged nodes.

Consider the following example. Healthcare environments nationwide may utilize a data integration application to extract data on patients suffering from a particular illness and transform the data into an organized table. Before the extract (e.g., first set of commands) and transform (e.g., second set of commands) commands can be executed, they may be assigned to sets of managed and unmanaged nodes. The sets of managed (e.g., node1) and unmanaged (e.g., node2) nodes may be tagged or identified (as described herein). Other nodes in the set of configuration data (e.g., node3) may not be identified by such tags. The lack of prefixed tags on these nodes may prevent the data integration application from distinguishing between managed and unmanaged nodes. Node3 may be compared with a list of nodes in managed nodes for similarities. Similarities may be found between node1 and node3. If found, node3 may be determined as a managed node. If a number of similarities are below a threshold (e.g., no similarities), it may be determined that node3 is an unmanaged node. The extract commands may be assigned to the determined managed nodes while the transform commands may be assigned to the determined unmanaged nodes. The managed nodes may extract data from the healthcare environment and the unmanaged nodes may transform the data into an organized table. Other examples of detecting a set of unspecified nodes may also be possible.

At block 540, a first set of commands of the data integration application may be assigned to the set of managed nodes. The assigning may occur as part of executing the data integration application. At block 560, a second set of commands of the data integration application may be assigned to the set of unmanaged nodes. The assigning may occur as part of executing the data integration application. At block 580, execution of the data integration application may be initiated. The initiating may occur using the set of managed nodes to process the first set of commands of the data integration application and the set of unmanaged nodes to process the second set of commands of the data integration application.

In embodiments, a set of data may be analyzed at block 582. Analyzing may include determining, evaluating, or resolving. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. The set of data may have both a first subset of the set of data and a second subset of the set of data. The first and second subsets of the set of data may include portions, parts, or pieces of (e.g., contained in) the larger set of data. Data analysis may extract information/patterns from the first and second subsets of data and transform or translate it into an understandable structure (e.g., a data report which can be provided/furnished) for further use. The first subset of the set of data may be stored on a managed cluster of nodes. The second subset of the set of data may be stored on an unmanaged cluster of nodes. The analyzing may occur as part of performing the execution request of data integration application. The analyzing may occur when data is desired or required to be processed. Some of the data (e.g., first subset) may be in a cluster managed by an RM while other parts of the data (e.g., second subset) may be in a cluster not managed by an RM.

In embodiments, the second subset of the set of data may be analyzed at block 583. Analyzing may include determining, evaluating, or resolving. The second subset of the set of data may be stored on the unmanaged cluster of nodes. The analyzing may occur on the unmanaged cluster of nodes to perform the execution request of the data integration application. The analyzing may occur when the data integration application processes data from a database outside the managed cluster. The data integration application may need to analyze the second subset of data on the unmanaged cluster of nodes in order to process the data.

Consider the following example. A retail store chain may utilize a data integration application to collect data from multiple stores. Some parts of this data may be stored in a cluster managed by an RM tool (e.g., managed) while other parts of this data may be stored in a cluster not managed by an RM tool (e.g., unmanaged). As an example, data from stores in the United States may be stored in a set of managed clusters while data from stores outside the United States may be stored in a set of unmanaged clusters. The data from the United States may make up a first subset of the set of data and the data from outside the United States may make up a second subset of the set of data. These subsets may be analyzed to perform the execution request (e.g., collect data from multiple stores). As an example, the data may be classified and categorized and a data report may be generated based on the subsets. The data integration application may desire to process the data from outside the United States (e.g., on the unmanaged cluster of nodes). The second subset of data pertaining to stores outside the United States may be analyzed to perform the execution request. Once the subsets of data have been assigned to clusters of nodes, the execution request may be processed and the retail store management may be provided with access to data from multiple stores, including those stores outside the United States whose data has been stored on the unmanaged cluster of nodes. Other examples of analyzing subsets of data may also be possible.

Method 500 concludes at block 599. Aspects of method 500 may provide performance or efficiency benefits for data integration application execution management. Aspects may save resources such as bandwidth, disk, processing, or memory. As an example, processing time may be saved by comparing a set of unspecified node identifiers with the set of managed node identifiers. As such, automatic detection of dynamic nodes may save processing time. Other examples of saving processing time may also be possible.

Figure 6:
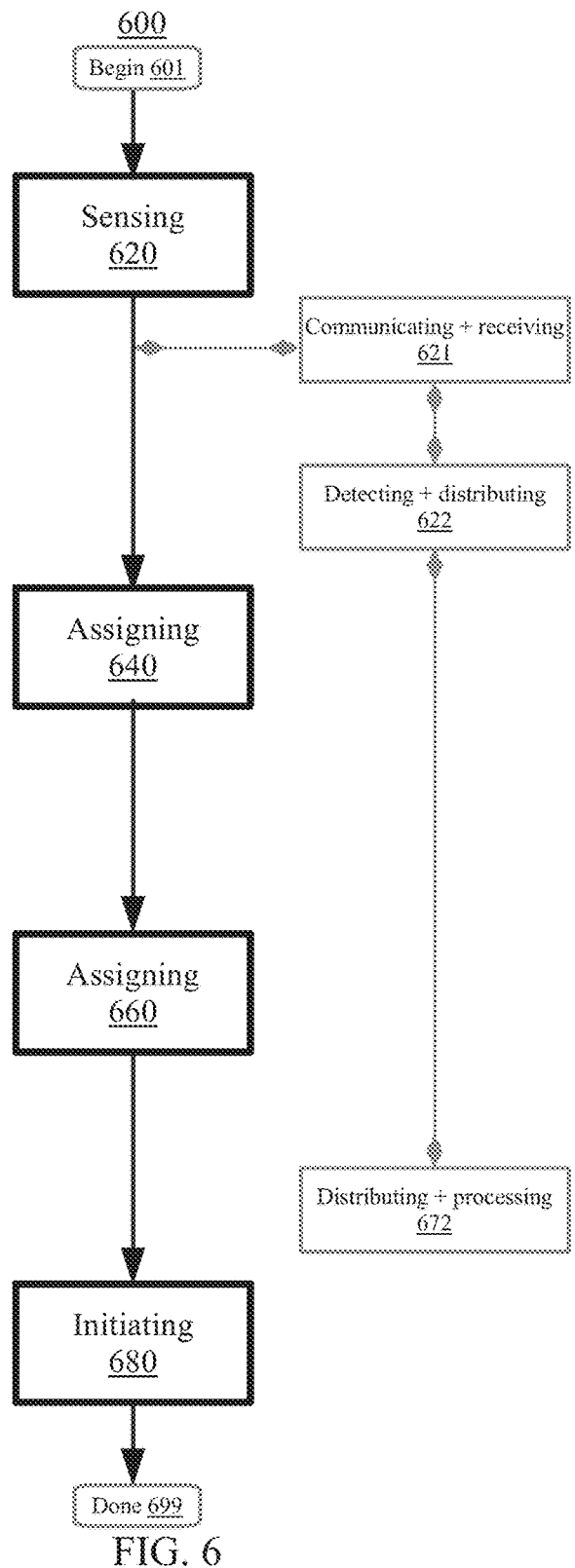
FIG. 6 is a flowchart illustrating a method for data integration application execution management using both a set of managed nodes and a set of unmanaged nodes, according to embodiments.

FIG. 6 is a flowchart illustrating a method 600 for data integration application execution management using both a set of managed nodes and a set of unmanaged nodes, according to embodiments. Aspects may be similar or the same aspects of method 400/500, and aspects may be utilized interchangeably. The method 600 may begin at block 601. At block 620, an execution request for a data integration application may be sensed. At block 640, a first set of commands of the data integration application may be assigned to the set of managed nodes. The assigning may occur as part of executing the data integration application. At block 660, a second set of commands of the data integration application may be assigned to the set of unmanaged nodes. The assigning may occur as part of executing the data integration application. At block 680, execution of the data integration application may be initiated. The initiating may occur using the set of managed nodes to process the first set of commands of the data integration application and the set of unmanaged nodes to process the second set of commands of the data integration application.

In embodiments, communicating and receiving may occur at block 621. A request related to a set of computing resources for allocation may be communicated. Communicating can include interacting, sending, deploying, executing, processing, or transmitting. The communicating may occur using a resource negotiation engine. The request may be communicated to an external resource management tool. A connection may be made to an external RM tool via a resource negotiator for allocating (e.g., those having a first set of indicators such as a prefix tag of "managed") resources for the managed nodes. An RM may be responsible for allocation of resources. The RM may allocate resources for the managed node names and send the list of actual node names back to the conductor. A part of the application called Application Master (AM, or Resource Negotiator) may be responsible for asking for resources from an RM tool and driving the application execution on the cluster. The set of computing resources may be received. Receiving can include acquiring, obtaining, attaining, collecting, accepting, or retrieving. The set of computing resources may be received by the set of managed nodes in response to the communication to the external resource management tool. RM tools may offer allocation of resources based on requirements (e.g., memory and CPU), allocation of resources on a given node name or anywhere in the cluster where no node name is given, and/or launch the parts of the application on the allocated nodes.

Consider the following example. A customer service center may utilize a data integration application to process data from customers reporting service problems. A request may be communicated to a resource management tool to extract text from customer complaints (e.g., a first set of commands) and transform the data into an organized list based on urgency (e.g., a second set of commands). An RM tool may allocate resources for the managed node names and send a list of actual node names back to the conductor based on the request. The conductor may receive the set of computing resources (e.g., a list of actual node names). As an example, the RM tool may provide the conductor with a list of managed nodes such as NodeA, NodeD, NodeH, NodeJ, and NodeL. The first set of commands (e.g., extracting customer complaints) may be assigned to Nodes A, D, H, J, and L for processing. The second set of commands (e.g., creating an organized list) may be assigned to the remaining nodes. Other examples of receiving the set of computing resources may also be possible.

In embodiments, detecting and distributing may occur at block 622. A set of allocated node identifiers may be detected. Generally, detecting can include sensing, receiving, recognizing, identifying, discovering, or ascertaining. A set of allocated node identifiers may include the nodes which have been assigned to the set of managed nodes as described herein. The detecting a set of allocated node identifiers may include sensing which (e.g., of an overall group of managed nodes) have been allocated with the computing resources. The set of allocated node identifiers may indicate that the set of managed nodes has been allocated with the set of computing resources. The first set of commands of the data integration application may be distributed to the set of managed nodes. Generally, distributing can include allocating, issuing, dispensing, circulating, or delivering. The first set of commands may be matched or joined to the set of managed nodes. The distributing may occur via a RM tool, a set of shell commands, or the like. The first set of commands may be assigned to the set of managed nodes as described herein.

Consider the following example. An educational environment may utilize a data integration application to extract standardized test scores (e.g., first set of commands) and transform the scores into an index (e.g., second set of commands). In order to process a request to extract and transform, the commands must be assigned to managed and unmanaged clusters of nodes. The RM tool may send a list of node names to the job conductor as described herein. A set of node identifiers may be detected which indicates that the set of managed nodes has been allocated with the set of computing resources. Examples of the node identifiers may include nodes tagged with "managed" (e.g., managed:

Node1, managed: Node3, managed: Node5). Once the set of node identifiers has been detected, the first set of commands may be distributed to the set of managed nodes. Nodes 1, 3, and 5 may execute the extracting of standardized test scores. Other examples of detecting a set of allocated node identifiers and distributing the first set of commands may also be possible.

In embodiments, distributing and processing may occur at block 672. The second set of commands of the data integration application may be distributed to the set of unmanaged nodes. Distributing can include allocating, issuing, dispensing, circulating, or delivering. The second set of commands may be matched or joined to the set of unmanaged nodes as described herein. The second set of commands may utilize a set of shell commands. The set of shell commands may include a network protocol for operating network services. The set of shell commands may include Secure Shell (SSH), Restricted Shell (RSH), or the like. The second set of commands of the data integration application may be processed using the set of shell commands on the set of unmanaged nodes. Processing may include initiating, enacting, running, executing, performing, carrying-out, or launching. The commands for managed nodes may be sent to the RM toll for launching the commands on the allocated resources. The commands may be run for unmanaged nodes (e.g., using SSH/RSH).

Consider the following example. The educational environment described herein may utilize the data integration application. The first set of commands (e.g., extracting the scores) may have been assigned to Nodes 1, 3, and 5. The second set of commands may utilize a set of shell commands, such as SSH and RSH. The set of shell commands may process the second set of commands on the set of unmanaged nodes (e.g., the remaining nodes/Node2/Node4). The second set of commands may be processed and the educational environment may be provided with an index of standardized test scores. Other examples of distributing and processing the second set of commands may also be possible.

Method 600 concludes at block 699. Aspects of method 600 may provide performance or efficiency benefits for data integration application execution management. Aspects may save resources such as bandwidth, disk, processing, or memory. As an example, processing may be saved by detecting a set of allocated node identifiers and distributing the first set of commands to the set of managed nodes. The automatic detection of a set of allocated node identifiers may indicate that the set of commands may belong to the set of managed nodes. Detecting automatically (e.g., as opposed to through a user) may require less processing. Other examples of saving processing may also be possible.

Figure 7:
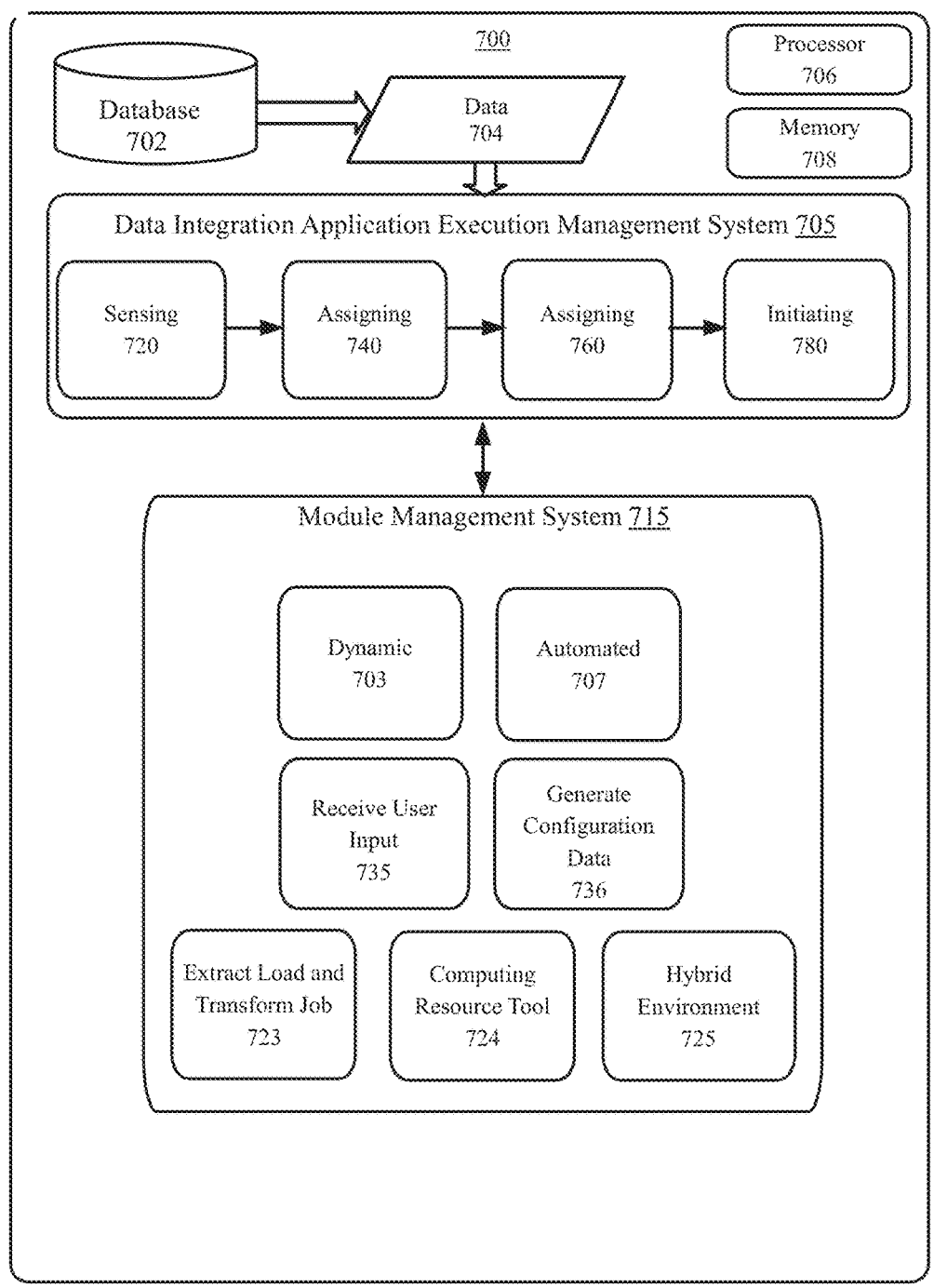
FIG. 7 shows an example system for data integration application execution management using both a set of managed nodes and a set of unmanaged nodes, according to embodiments.

FIG. 7 shows an example system 700 for data integration application execution management using both a set of managed nodes and a set of unmanaged nodes, according to embodiments. The example system 700 may include a processor 706 and a memory 708 to facilitate implementation of data integration application execution management techniques. The example system 700 include a database 702 configured to maintain data and information pertaining to cluster topology and cloud partition events. In embodiments, the example system 700 may include a data integration application execution management system 705. The data integration application execution management system 705 may be communicatively connected to the database 702, and be configured to receive data 704 related to cluster topology changes. The data integration application execution management system 705 may include a sensing module 720 to sense an execution request, an assigning module 740 to assign a first set of commands to the set of managed nodes, an assigning module 760 to assign a second set of commands to the set of unmanaged nodes, and an initiating module 780 to initiate execution of the data integration application. The data integration application execution management system 705 may be communicatively connected with a module management system that includes one or more modules for implementing aspects of data integration application execution management.

In embodiments, the steps described herein may be performed in a dynamic fashion at module 703. The sensing, the assigning of the first set of commands, the assigning of the second set of commands, the initiating execution, and the other steps described herein may each be performed in a dynamic fashion to streamline data integration application execution management using both the set of managed nodes and the set of unmanaged nodes. The set of operational steps may occur in real-time, ongoing, or on-the-fly. As an example, one or more of the operational steps described herein may be carried-out in an ongoing basis to facilitate, promote, or enhance data integration application execution management using both a set of managed nodes and a set of unmanaged nodes. Other examples may also be possible.

In embodiments, the steps described herein may be performed in an automated fashion at module 707. The sensing, the assigning of the first set of commands, the assigning of the second set of commands, the initiating execution, and the other steps described herein may each be performed in an automated fashion without user intervention. The operational steps may each occur in an automated fashion without user intervention or manual action (e.g., using automated computer machinery, fully machine-driven without manual stimuli). The automated operational steps may be performed by a data integration application execution management engine (e.g., as part of a data management system), a cloud management engine (e.g., as part of a cloud environment), or the like.

In embodiments, a user input may be received at module 735. Receiving can include acquiring, obtaining, attaining, collecting, accepting, or retrieving. The user input may include queries, commands, or the like from a user (e.g., not automatically performed by the data integration application execution management engine). The user input may relate to the first and second sets of indicators. The user input may be received from a user. Users may perform tasks or executions on the combination of managed and unmanaged sets of nodes by specifying the proposed tags (e.g., "managed" and "unmanaged") to the respective node names in the configuration file. In certain specific embodiments, users may perform tasks or executions on only the managed or only the unmanaged set of nodes by specifying the tags "managed" or "unmanaged." In embodiments, the set of configuration data may be generated at module 736. Generating can include providing, transmitting, conveying, presenting, or displaying the set of configuration data. The set of configuration data may be generated based on (e.g., in response to) the user input. The set of configuration data may include the first and second sets of indicators.

Consider the following example. A government environment may utilize a data integration application to extract information from civilian service officers in various locations (e.g., a first set of commands) and transform the data into a white paper report (e.g., a second set of commands). A user, such as a government employee may wish to manually specify the indicators for the clusters of nodes. As an example, the user may manually label Nodes A, B, and C as "managed" and Nodes D and E as "unmanaged." Based on the input from the user, the set of configuration data may be generated. The set of configuration data may include a list of the Nodes (e.g., A, B, C, D, E) and the user-specified identifiers:
managed: Node A
managed: Node B
managed: Node C
unmanaged: Node D
unmanaged: Node E
The set of configuration data may be used to assign the sets of commands to different clusters of nodes. The extract command may be assigned to nodes A, B, and C while the transform command may be assigned to nodes D and E. The execution request may be initiated as described herein. Other examples of receiving a user input related to the sets of indicators may also be possible.

In embodiments, an Extract Transform and Load (ETL) job may be sensed at module 723. Sensing can include detecting, receiving, recognizing, identifying, discovering, or ascertaining. An ETL job may include a process in database usage where data is extracted from data sources, transformed for storing in the proper format/structure, and loaded into the final target database. A first set of commands of the ETL job may be assigned to the set of managed nodes. The assignment to the set of managed nodes may occur as described herein as part of executing the ETL job. A second set of commands of the ETL job may be assigned to the set of unmanaged nodes as described herein as part of executing the ETL job. Execution of the ETL job may be initiated as described herein. Execution may be initiated using the set of managed nodes to process the first set of commands of the ETL job and the set of unmanaged nodes to process the second set of commands of the ETL job. The first and second sets of commands of the ETL job may be processed. Processing can include initiating, enacting, running, executing, performing, carrying-out, or launching. The processing may occur using both the set of managed nodes and the set of unmanaged nodes in a simultaneous fashion. The processing may occur in parallel to enable users to run an ETL job on a set of nodes managed by an RM (e.g., Hadoop YARN). The integration of managed and unmanaged nodes may assist in the processing.

Consider the following example. A group of scientists may use a data integration application to process an ETL job. The scientists may wish to extract information from multiple tables of experimental data, transform the data into a readable format (e.g., index, chart), and load the readable format to the target database. The data integration application may sense an ETL job request when the scientist renders an application window to enter a command. A first set of commands (e.g., extract data) may be assigned to the set of managed nodes while a second set of commands (e.g., transform data into index/chart and load data) may be assigned to the set of unmanaged nodes. The ETL job may be executed using both the set of managed nodes and the set of unmanaged nodes. The set of managed nodes may extract the data while the set of unmanaged nodes may transform and load the data. The first and second sets of commands may be processed in parallel using both sets of nodes (e.g., managed and unmanaged). The scientists may be provided with an index or chart of the data extracted from multiple tables. Other examples of processing a request for an ETL job may also be possible.

In embodiments, it may be detected that a managed cluster of nodes lacks a computing resource tool to process a set of data at module 724. Detecting may include sensing, recognizing, identifying, or ascertaining that a managed cluster of nodes lacks (e.g., absence of) a computing resource tool. A computing resource tool may include a system or structure within a computer system which performs tasks (e.g., process a set of data). It may be detected that an unmanaged cluster of nodes has the computing resource tool to process the set of data. The data integration application running in a managed cluster may need to utilize some resources outside the cluster due to availability of a software on only those resources. The set of data may be processed on the unmanaged cluster of nodes. Processing can include initiating, enacting, running, executing, or launching. The processing may occur as part of performing the execution request of data integration application. The integration of managed and unmanaged nodes may assist in the processing.

Consider the following example. A healthcare environment may wish to access data from patients nationwide suffering from a particular illness as described herein. The first set of commands (e.g., extract patient information) may be assigned to a managed cluster of nodes while the second set of commands (e.g., create a table) may be assigned to an unmanaged cluster of nodes. It may be detected that the managed cluster of nodes lacks a computing resource tool to extract the patient information. The unmanaged cluster of nodes may have this computing resource tool. The first set of commands may be transmitted to the unmanaged cluster of nodes. In order to perform the execution request (e.g., extract information and create a table), the set of data may be processed on the unmanaged cluster of nodes. The unmanaged cluster of nodes may extract the patient information and create the organized table. The healthcare professional may be provided with the organized table of patient information. Other examples of using a computing resource tool to process a request may also be possible.

In embodiments, it may be detected that a managed cluster of nodes is in a cloud environment at module 725. Detecting may include sensing, recognizing, identifying, or ascertaining that a managed cluster of nodes is in a cloud environment. The cloud environment may include surroundings or conditions in which a cloud computing system may operate. It may be detected that an unmanaged cluster of nodes is in an on-premises environment (e.g., not part of a cloud environment). The data integration application running in a managed cluster may need to utilize some resources outside the cluster because of the availability of resources of an on-premises node. The first and second sets of commands of the data integration application may be processed. The processing may occur using both the set of managed nodes in the cloud environment and the set of unmanaged nodes in the on-premises environment. Processing can include initiating, enacting, running, executing, or launching. The processing may occur in parallel in a simultaneous fashion. The integration of managed and unmanaged nodes may assist in the processing.

Consider the following example. The retail chain described herein may wish to access sales information from a plurality of locations. The locations within the United States may be assigned to the managed cluster of nodes while the locations outside the United States may be assigned to the unmanaged cluster of nodes. It may be detected that the managed cluster of nodes is in a cloud environment while the unmanaged cluster of nodes is in an on-premises environment. In order to initiate the execution request, the first set of commands may be executed using the set of managed nodes (e.g., in the cloud environment) while (e.g., simultaneously, in a parallel fashion) the second set of commands are executed using the set of unmanaged nodes (e.g., in the on-premises environment). In this way, the execution request may be processed and the retail manager may be provided with the desired sales information (e.g., from a plurality of locations). Other examples of using multiple environments to process a request may also be possible.

Figure 8:
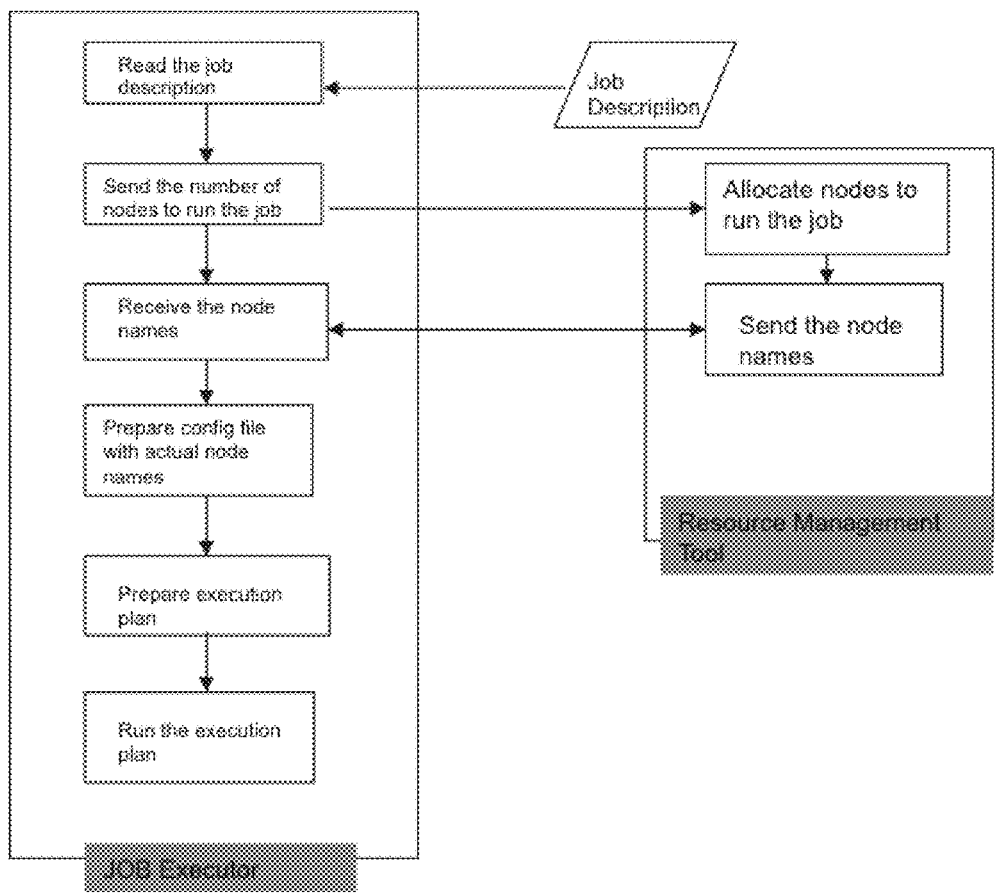
FIG. 8 illustrates an example of data integration application execution management using both a set of managed nodes and a set of unmanaged nodes, according to embodiments.

FIG. 8 illustrates an example 800 of data integration application execution management using both a set of managed nodes and a set of unmanaged nodes, according to embodiments. The job executor and RM tool may both take part in the execution of a data integration application. The job executor may read the job description (e.g., execution request) and send the number of nodes to run the job (e.g., ETL request) to the RM tool. The RM tool may allocate appropriate nodes to run the job and send the node names back to the job executor. The job executor may prepare a configuration file with the actual node names. The job executor may prepare and run the execution plan.

Figure 9:
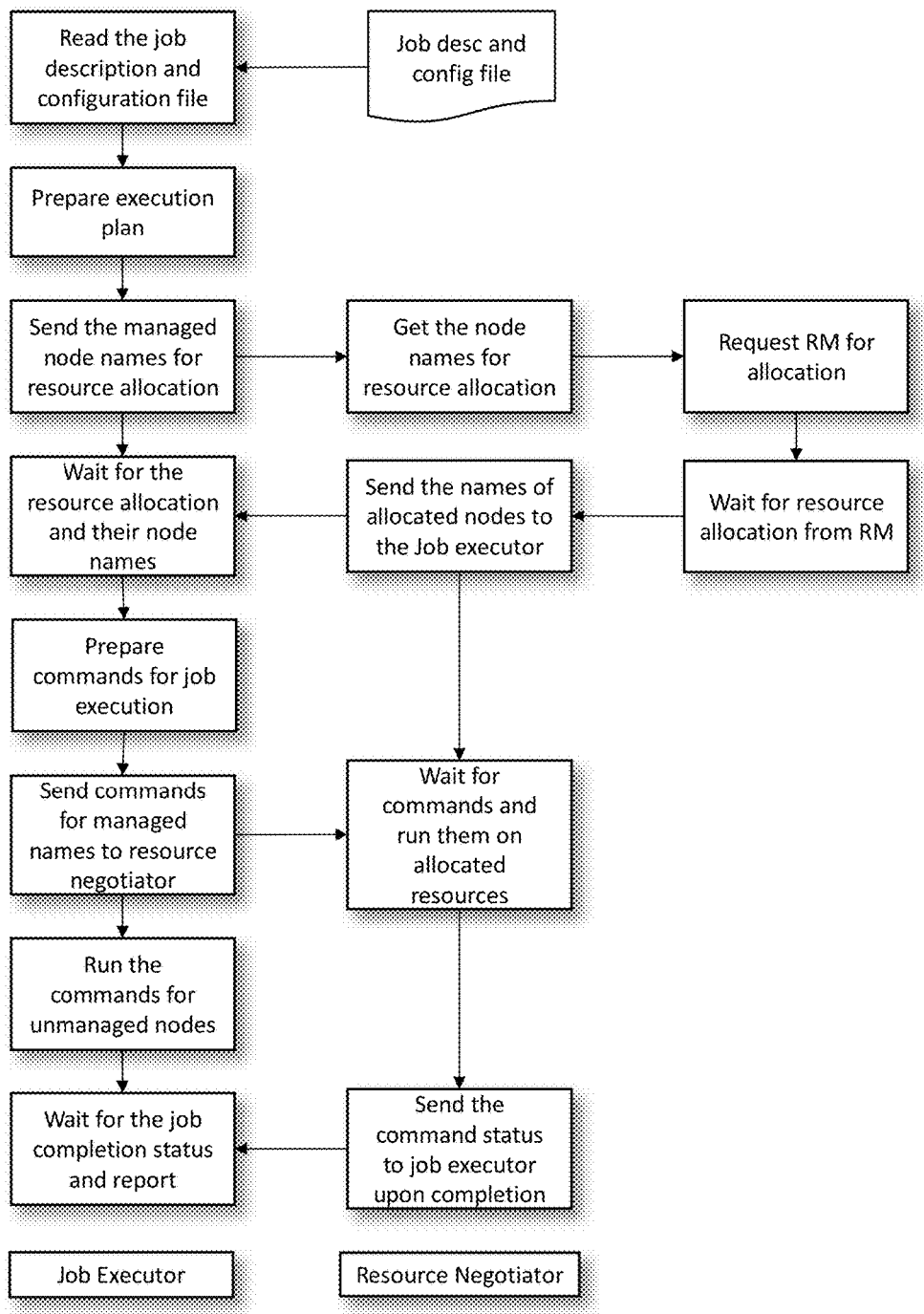
FIG. 9 illustrates an example of data integration application execution management using both a set of managed nodes and a set of unmanaged nodes, according to embodiments.

FIG. 9 illustrates an example 900 of data integration application execution management using both a set of managed nodes and a set of unmanaged nodes, according to embodiments. The job executor and resource negotiator tool may both take part in the execution of a data integration application. The job executor my read the job description and configuration file and prepare an execution plan. The job executor may send the managed node names for resource allocation to the resource negotiator. The resource negotiator may receive the node names and send a request to the RM tool for allocation. Once the RM transmits the resource allocation, the resource negotiator may send the names of the allocated nodes to the job executor. The job executor may prepare commands for job execution and send commands for the managed nodes to the resource negotiator. The resource negotiator may receive these commands and run them on the allocated resources before sending the command status to the job executor upon completion. The job executor may receive the job completion status and report.

FIG. 10 illustrates an example 1000 of data integration application execution management using both a set of managed nodes and a set of unmanaged nodes, according to embodiments. The figure illustrates an example of a configuration file, including an example set of data. Four nodes are indicated in the first. The first node has an identifier of "mynode1" and has been tagged as a managed node. "mynode1" may be assigned to the set of managed nodes based on this tag. "mynode1" may process a first set of commands of the execution request. The second node has been tagged as a managed node or more specifically a non-static (e.g., dynamic) managed node. The second node may be assigned to the set of (dynamic) managed nodes and may process a first set of commands of the execution request. The third node has an identifier "my node3" and has been tagged as an unmanaged node. "mynode3" may be assigned to the set of unmanaged nodes to process a second set of commands of the execution request. In certain embodiments, "mynode3" may not be specified as an unmanaged node via an identifier (e.g., mynode3 is an unspecified node). "mynode3" may be compared to the list of managed nodes, including the first and second nodes described herein. There may be no similarities between "mynode3" and the other managed nodes. It may be determined that "mynode3" is an unmanaged node and may be assigned to the set of unmanaged nodes. Other examples of configuration files and sets of data may also be possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for data integration application execution management using both a set of managed nodes and a set of unmanaged nodes, the method comprising:

sensing an execution request for a data integration application;

assigning, to execute the data integration application, a first set of commands of the data integration application to the set of managed nodes;

determining, based on a set of configuration data having a first set of indicators that corresponds to the first set of commands of the data integration application, to assign the first set of commands of the data integration application to the set of managed nodes, wherein the set of configuration data is selected from the group consisting of source code, node identifiers, and commands, and wherein the first set of commands is selected from the group consisting of Extract commands, Transform and Load (ETL) commands, and Standard Query Language (SQL) commands;

structuring the first set of indicators to include a first set of tags coupled with a set of managed node identifiers for the set of managed nodes, wherein the set of managed node identifiers includes a managed prefix tag;

assigning, to execute the data integration application, a second set of commands of the data integration application to the set of unmanaged nodes;

determining, based on the set of configuration data having a second set of indicators that corresponds to the second set of commands of the data integration application, to assign the second set of commands of the data integration application to the set of unmanaged nodes;

structuring the second set of indicators to include a second set of tags coupled with a set of unmanaged node identifiers for the set of unmanaged nodes, wherein the set of unmanaged node identifiers includes an unmanaged prefix tag; and initiating execution of the data integration application using:

the set of managed nodes to process the first set of commands of the data integration application, and the set of unmanaged nodes to process the second set of commands of the data integration application;

wherein the set of managed nodes includes a resource manager and the set of unmanaged nodes does not include a resource manager.

* * * * *